US005945461A

United States Patent [19]

Gosiewski et al.

[11] Patent Number: 5,945,461

[45] Date of Patent: Aug. 31, 1999

[54] FOAMED ACRYLIC POLYMER COMPOSITIONS

[75] Inventors: Donald E. Gosiewski, Peabody; Paul C. Briggs, Beverly, both of Mass.

[73] Assignee: Illinois Tool Works Inc., Glenview, Ill.

[21] Appl. No.: 07/672,961

[22] Filed: Mar. 21, 1991

[51] Int. Cl.[6] .................................................. C08J 9/04

[52] U.S. Cl. .......................... 521/123; 521/125; 521/130; 521/138; 521/139; 521/148; 521/149; 524/460; 524/529; 524/244; 524/305

[58] Field of Search .................................... 521/138, 139, 521/148, 149, 123, 125, 130; 524/460, 529; 525/305, 244

[56] References Cited

U.S. PATENT DOCUMENTS

| | | | |
|---|---|---|---|
| 3,470,277 | 9/1969 | Hagan et al. . | |
| 3,673,126 | 6/1972 | Carmody et al. | 521/921 |
| 3,804,684 | 4/1974 | Tokushige et al . | |
| 3,813,462 | 5/1974 | Roberts . | |
| 3,944,508 | 3/1976 | Barth et al. | 521/139 |
| 3,944,631 | 3/1976 | Yu et al. . | |
| 3,948,497 | 4/1976 | Lovitt et al. . | |
| 3,985,703 | 10/1976 | Ferry et al. . | |
| 4,004,621 | 1/1977 | Weienaar et al. . | |
| 4,033,840 | 7/1977 | Fujiwara et al. . | |
| 4,034,013 | 7/1977 | Lane . | |
| 4,041,103 | 8/1977 | Daivson et al. . | |
| 4,071,494 | 1/1978 | Gaylord | 525/244 |
| 4,096,202 | 6/1978 | Farnham et al. . | |
| 4,156,754 | 5/1979 | Cobbs, Jr. et al. | 521/908 |
| 4,183,991 | 1/1980 | Smiley et al. | 428/220 |
| 4,242,470 | 12/1980 | Gergen et al. . | |
| 4,306,040 | 12/1981 | Baer . | |
| 4,530,806 | 7/1985 | Melchior | 264/22 |
| 4,574,142 | 3/1986 | Charnock | 525/305 |
| 4,598,123 | 7/1986 | Cutter . | |
| 4,942,201 | 7/1990 | Briggs et al. . | |
| 4,944,819 | 7/1990 | Gebauer . | |
| 5,122,316 | 6/1992 | Saatchi etal. | 521/87 |

FOREIGN PATENT DOCUMENTS

| | | |
|---|---|---|
| 0014574 | 8/1980 | European Pat. Off. . |
| 49-106590 | 10/1974 | Japan . |
| 8271230 | 7/1982 | Japan . |
| 1301730 | 12/1989 | Japan . |
| 4121037 | 6/1996 | Japan . |
| 8605793 | 10/1986 | WIPO . |

OTHER PUBLICATIONS

Kirk–Othmer: *Encyclopedia Of Chemical Technology,* 3rd Ed., vol. 8, pp. 626–638.

*Encyclopedia Of Polymer Science and Technology,* vol. 2, pp. 532–565, John Wiley & Sons, Inc. 1965.

*Primary Examiner*—John M. Cooney, Jr.

*Attorney, Agent, or Firm*—Pauley Petersen Kinne & Fejer

[57] ABSTRACT

Foamed in place polymer compositions are made from monomer-in-polymer solutions containing free radical polymerization catalysts and foaming agents.

27 Claims, No Drawings

FOAMED ACRYLIC POLYMER COMPOSITIONS

BACKGROUND OF INVENTION

The field of art to which this invention is directed is foamed or cellular polymer compositions.

Foamed or cellular polymers have been commercially accepted in a wide variety of applications for a number of years. A foamed or cellular polymer or plastic is defined as a plastic the apparent density of which is decreased substantially by the presence of numerous cells disposed throughout its mass. The terms cellular plastic or polymer, foamed plastic or polymer, expanded plastic or polymer, and plastic or polymer foam have been used interchangeably to denote two-phase gas-solid systems in which the solid is continuous and composed of a synthetic polymer or rubber.

Polymers used in a large number of industrial foamed compositions are cellulose acetate, epoxy resins, styrene/polyester resins, phenolic resins, polyethylene, polystyrene, silicones, urea-formaldehyde resins, polyurethanes, latex foam rubbers, natural rubber, synthetic-elastomers, poly (vinyl chloride), ebonite, and polytetrafluoroethylene. Foamed polymers have been used for insulation, both sound and temperature, in furniture padding and in mattresses, as sponges, in packing materials, in plastic articles, as adhesives and the like.

Polyurethanes are used widely in foamed plastic applications even though isocyanates used in making polyurethanes present environmental problems. Polyurethanes find limited use in foamed adhesive compositions due to the fact that bonding of the polyurethane to a substrate requires, in most cases, a primer to enhance or maintain adhesion.

Epoxy-resin foams are characterized by good adhesive strength, which is important when foamed-in-place formulations are used, low water absorption, good dimensional stability, good heat resistance and, generally, good chemical resistance. The properties of rigid and semi-rigid epoxy foams are comparable to polyurethane formulations. However, because of the availability of lower cost foams with properties adequate for most commercial applications and because of the difficulties in achieving elastomeric epoxy systems, epoxy-resin foams are employed in somewhat specialized applications.

Acrylic resins have been used in hot melt thermoplastic adhesive systems. Hot melt thermoplastic adhesives are defined as solvent free adhesives which are applied in a molten state and which form a bond upon cooling to a solid state. A method for making foamed hot melt adhesives is described in U.S. Pat. No. 4,156,754. This method involves melting the thermoplastic resin, e.g., polymethyl methacrylate or polyethyl acrylate, dissolving a gas in the molten polymer under pressure, dispensing the melt under lower pressure so that the gas is released to form a foam, and compressing the hot foam between two substrates to force the gas from the foam and to form a bond with the substrates.

In U.S. Pat. No. 4,530,806, in the Background of the Invention, two processes for making foamed plastics are discussed. In one process, the starting composition which contains monomers and foaming agent is polymerized and foamed in a single stage process.

The other process is a two stage process again involving a composition containing monomers and foaming agent. In the first stage of this process, the monomers are polymerized without activating the foaming agent. In the second stage, the polymer is heated to a plastic or fluid condition, the foaming agent is activated, and the foamed plastic is formed.

U.S. Pat. No. 4,530,806 is directed to a process for making articles of foamed methyl methacrylate which involves (a) mixing methyl methacrylate, a plasticizing monomer, a polymerization catalyst, and a foaming agent which is not activated at the polymerization temperature; (b) polymerizing the monomers; and (c) heating the polymer to soften it and to activate the foaming agent, thereby forming a foamed article.

In U.S. Pat. No. 3,813,462, rigid acrylic polymer foams are prepared by polymerizing alpha-chloro-acrylic acid at room temperature, and then heating the polymer to generate an internal foaming agent through decomposition.

U.S. Pat. No. 3,804,684 discloses the formation of foamed plastics involving the extrusion of a polymer, e.g., polymethyl methacrylate, and a blowing agent.

In U.S. Pat. No. 3,673,126, a monomer, e.g., methyl methacrylate, is polymerized, the newly formed polymer is mixed with a foaming agent, and the mixture is extruded and foamed.

U.S. Pat. No. 3,470,277 describes a process for making cellular plastic products by soaking sheets of a polymer, e.g., polymethyl methacrylate, in a volatile liquid, stretching the sheets and heating them to form the foamed product.

A compressible cellular plastic material made from a polyacrylate elastomer is disclosed in U.S. Pat. No. 4,004,621.

Foamable, free-radical curable 2-component reactive resin compositions for use in fastening anchoring means in boreholes are described in U.S. Pat. No. 4,944,819. The disclosed reactive resin system is a styrene solution of an unsaturated polyester resin and a free radical catalyst.

In Kunstoffe 1978, 68(3), 141–4, Kircher and Preper describe the preparation of foamed plastics from blends of polymethyl methacrylate and polyurethanes made by polymerizing the urethane and acrylic monomers as a mixture.

There is a need for "foamed-in-place" cellular plastics which form strong adhesive bonds and which can be recycled for subsequent use.

SUMMARY OF INVENTION

This invention is directed to foamed acrylate based polymer compositions. In one aspect, this invention pertains to acrylate based compositions which can be polymerized and foamed in place. In another aspect, this invention pertains to two part compositions which when mixed will polymerize and foam in place.

The compositions of this invention are comprised of an acrylate or methacrylate monomer, a polymer which dissolves in or which is at least swelled by the monomer, a free radical catalyst and means for foaming the composition.

DESCRIPTION OF INVENTION

The monomers useful in this invention are alkyl methacrylate ester monomers wherein the ester group is an alkyl, cycloalkyl or alkoxy group which contains one to about 12 carbon atoms. Examples of such monomers are methyl methacrylate, ethyl methacrylate, iso-butyl methacrylate, t-butyl methacrylate, n-butyl methacrylate, 2-ethylhexyl methacrylate, cyclohexyl methacrylate, lauryl methacrylate and the like. The preferred monomer is methyl methacrylate.

Additional monomers which can be used in combination with the methacrylate monomers are alkyl acrylates wherein the alkyl group contains two to about 12 carbon atoms, examples of which are ethyl acrylate, n-butyl acrylate, isobutyl acrylate, t-butyl acrylate, 2-ethylhexyl acrylate, lauryl acrylate and the like. Other useful monomers are acrylonitrile, methacrylonitrile, styrene, vinyl toluene, and the like.

Preferred monomer compositions contain at least about 50 weight percent alkyl methacrylate, and most preferably, at least about 50 weight percent methyl methacrylate wherein said weight percents are based on the total monomer weight.

Di- or poly functional vinyl, allyl, acrylate or methacrylate monomers or oligomers, can be added to crosslink the polymer if desired. In the absence of such additives, the acrylate or methacrylate polymer is largely thermoplastic in nature. The addition of crosslinking monomers confers a degree of thermoset character in proportion to the amount added. Such characteristics as heat and solvent resistance, as well as certain physical or mechanical properties, are enhanced or modified by such additions, according to the principles well known to those skilled in the art. The polyfunctional monomers are those which contain 2 or more polymerizable ethylenically unsaturated groups and, preferably, two to six ethylenic groups. Examples of such compounds are the diacrylic or methacrylic acid esters of ethylene glycol, propylene glycol, butanediol, hexandediol, and polyoxyalkylene glycols, di and tri acrylic or methacrylic esters of hexanetriol, trimethylol ethane, and trimethylol propane, di, tri and tetra acrylic or methacrylic esters of pentaerythritol, diallyl maleate, diallylfumarate, divinyl benzene, diacrylic or methacrylic esters of hydroxy terminated urethane prepolymers and the like. If used, the polyfunctional monomers will comprise up to about 10 weight percent based on the total weight of monomers.

Ethylenically unsaturated free radical polymerizable carboxylic acids can also be used in combination with the alkyl methacrylate monomers. Such acids, generally, contain one or two carboxylic acid groups and three to about 10 carbon atoms. Examples of such acids are acrylic acid, methacrylic acid, crotonic acid, maleic acid, fumaric acid, itaconic acid, and alkyl half-esters of maleic or fumaric acids wherein the alkyl group contains one to six carbon atoms. The preferred acid for use in this invention is methacrylic acid. Such acids are utilized in the amount of zero up to about 10 weight percent based on the total weight of monomers.

Polymers useful in this invention are those polymers which are soluble in the monomers described hereinabove. Such polymers which form "polymer-in-monomer" solutions should have molecular weights of at least about five thousand up to about one million or more. The molecular weight should not be greater than a value compatible with the solubility in the chosen monomer. Preferred polymers for use in this invention are elastomeric polymers although other polymers, such as homo and copolymers of styrene, acrylonitrile, vinyl acetate, alkyl acrylates, e.g., ethyl acrylate, alkyl methacrylates, e.g., methyl methacrylate, vinyl chloride, vinylidene chloride and vinyl butyral, can be used. Elastomeric polymers, which are defined by ASTM as materials that can be stretched at room temperature to twice their length, held for 5 minutes, and upon release will return to within 10 percent of their original length over a similar period of time, include such polymers as natural rubber, isoprene rubber, butadiene rubber, chloroprene rubber, isobutylene-isoprene rubber, nitrile-butadiene rubber, styrene butadiene rubber, ethylene-propylene copolymers ethylene-propylene-diene terpolymers, silicones, fluoroelastomers, polyacrylates, polyethers, e.g., polyepichlorohydrin, chlorosulfonated polyethylene, chlorinated polyethylene, ethylene-acrylic copolymers, polypropylene oxide, thermoplastic elastomers, and thermoplastic resins.

The above-described elastomeric polymers are thermoplastic in nature as used in this invention, since they, generally, are used in the "soluble" or non-crosslinked state. True thermoplastic elastomers, those which are designed to be processed and used in substantially non-vulcanized form, are also useful in the present invention, provided they can be dissolved or dispersed in the monomers.

Thermoplastic elastomers, often referred to as elastoplastics, combine many of the good properties of vulcanized elastomers with the processing characteristics of thermoplastics.

Thermoplastic elastomers are described in detail in Kirk-Othmer "Encyclopedia of Chemical Technology", 3rd Ed., Vol 8, pages 626–638, which is hereby incorporated by reference. The preferred thermoplastic elastomers for use as the polymer-in-monomer are the styrene-diene block copolymers, e.g., block copolymers of styrene and butadiene or isoprene, as described in detail in U.S. Pat. Nos. 4,041,103 and 4,242,470 which are hereby incorporated by reference.

Mixtures of polymers can be used as the "polymer-in-monomer". The polymers are soluble in the monomers so as to form polymer-in-monomer solutions of from about 10 to about 60 weight percent polymer based on the weight of the solution. As used herein, the term "solution" is intended to cover not only true solutions but colloidal dispersions which exhibit normal or substantially newtonian rheology characteristics. The amount of polymer used in this invention is about 10 to about 60 weight percent based on the total composition weight, and, preferably, about 20 to about 50 weight percent.

Additional polymers which can be used in combination with the polymer of the "polymer-in-monomer" are core-shell graft polymers which swell in the monomers but do not dissolve in them. The "core" or backbone polymer of the graft copolymer has a glass transition temperature substantially below ambient temperatures. The "shell" polymer which is grafted onto the backbone polymer has a glass transition temperature substantially above ambient temperatures. Ambient temperature is defined as the temperature range in which the composition is used.

Examples of useful core-shell graft copolymers are those where "hard" monomers, such as styrene, acrylonitrile or methyl methacrylate, are grafted on to a rubbery core made from polymers of "soft" or "elastomeric" monomers, such as butadiene or ethyl acrylate.

U.S. Pat. No. 3,985,703, which is hereby incorporated by reference, describes useful core-shell polymers, the cores of which are made preferably from butyl acrylate but can be based on ethyl, isobutyl, 2-ethylhexyl, or other alkyl acrylates or mixtures thereof. The core polymer, optionally, can contain up to 20 percent of other copolymerizable monomers, such as styrene, vinyl acetate, methyl methacrylate, butadiene, isoprene and the like. The core polymer can also contain up to 5 percent of a crosslinking monomer having two or more nonconjugated double bonds of approximately equal reactivity, such as ethylene glycol diacrylate, butylene glycol dimethacrylate and the like. It also optionally can contain up to 5 percent of a graft-linking monomer having two or more nonconjugated double bonds of unequal reactivity, such as diallyl maleate and allyl methacrylate.

The shell stage is preferably polymerized from methyl methacrylate and optionally other lower alkyl methacrylates, such as ethyl, butyl, or mixtures thereof. Up to about 40 percent by weight of the shell monomers can be styrene, vinyl acetate, vinyl chloride, and the like.

Additional useful core-shell graft copolymers are described in U.S. Pat. Nos. 3,948,497, 4,096,202, and 4,034,013, which are hereby incorporated by reference.

Still other useful core-shell polymers are the "MBS" polymers such as those described in U.S. Pat. No. 4,304,709 which is hereby incorporated by reference. The MBS polymers are made by polymerizing methyl methacrylate in the presence of polybutadiene or polybutadiene copolymer rubber.

Other patents which describe various useful core-shell graft copolymers are U.S. Pat. Nos. 3,944,631, 4,306,040 and 4,495,324, each of which is hereby incorporated by reference.

The core-shell graft copolymers are used in this invention in the amount of about 0 to about 25 weight percent, preferably, about 10 to about 20 weight percent, wherein said weight percents are based on the total weight of the composition.

Additional components of the composition of this invention are polymerization catalysts with or without other components which enhance the reactivity of the catalysts. The catalysts are free radical generators which trigger the polymerization of acrylate and methacrylate compounds. Such catalysts are peroxides, hydroperoxides, peresters, peracids, radiant energy, e.g., ultraviolet light, and heat. Examples of these catalysts are benzoyl peroxide, cumene hydroperoxide, tertiary butyl hydroperoxide, dicumyl peroxide, tertiary butyl peroxide acetate, tertiary butyl perbenzoate, ditertiary butyl azodiisobutyronitrile and the like. These free radical producing catalysts are used in amounts of about 0.01 to about 10 weight percent based on the weight of the composition. Preferably, the catalysts will be used in the amount of about 0.05 to about 3 weight percent. Some catalysts, such as benzoyl peroxide, are supplied as diluted or extended pastes for safety and handling reasons. The amount used in such cases refers to the active ingredient content.

Other components which enhance the reactivity of the catalysts are initiators or activators and promoters. Initiators and activators, which terms are used inchangeably, include tertiary amines and aldehyde-amine reaction products. Useful tertiary amines include N,N-dimethylaniline, N,N-dimethyltoluidine, N,N-diethylaniline, N,N-diethyltoluidine, N,N-bis(2-hydroxyethyl-p-toluidine, N,N-diisopropanol-p-toluidine, and the like. Aldehyde-amine reaction products include such compositions as the reaction products of butyaldehyde-aniline and butyraldehyde-butylamine.

The promoter is an organic salt of a transition metal, such as cobalt, nickel, manganese or iron naphthenate, copper octoate, copper acetylacetonate, iron hexoate, or iron propionate.

The initiators or activators, if used, are added in the amount of up to about 15 weight percent based on the weight of the compositions. Preferred amounts are 0.01 to about 5 weight percent. Promoters are used in amounts up to about 0.5 weight percent, preferably about 1 part per million to about 0.5 weight percent.

Foaming agents used in this invention are any of the foaming agents commonly used in the foamed polymer art. Examples of such foaming agents include gas and low boiling liquids as well as chemical foaming agents which are either activated by heat or by a chemical reaction when two or more components are mixed together.

Examples of gaseous and low boiling liquid foaming agents include air, nitrogen, carbon dioxide, the various halocarbons, including fluorocarbons, chlorofluorocarbons, and chlorocarbons, the pentanes, hexanes, acetone, methyl ethyl ketone and the like.

Examples of multipart foaming agents are metal carbonates and bicarbonates plus acids, such as sodium bicarbonate, sodium carbonate, and calcium carbonate plus citric acid, sulfamic acid and the like. The polymerizable acid referred to hereinbefore, e.g., methacrylic acid can also be part or all of the acid portion of the two part foaming agent. Other multipart foaming agents are sodium borohydride and water.

Foaming agents are described in detail in "Encyclopedia of Polymer Science and Technology", Vol. 2, pages 532–565, John Wiley & Sons, Inc., 1965 which is hereby incorporated by reference.

The foaming agents are mixed with the monomer-polymer solutions of this invention, and are activated when the monomer in the monomer-polymer solution polymerize. Such activation can be accomplished by pressure reduction, or by heat either applied externally or from the exothermic polymerization reaction. Preferably, activation is accomplished by bringing together the components of a multipart foaming system.

The amount of foaming agent used in this invention will vary widely depending on whether it is a gas, a liquid, or a chemical composition which decomposes or reacts to form a gas. The amount of foaming agent to be used is based on the desired density of the foamed composition. The amount will vary from an amount which is sufficient to overcome the shrinkage that occurs during the polymerization reaction, i.e., wherein the density after polymerization is about the same as the density before polymerization, to an amount which produces a low density foam, i.e., a foam having a density as low as 0.25 g/cc or less. The exact amount of foaming agent to be used can be readily determined by those skilled in the art.

Other useful additives that are well-known in the foamed polymer art and which can optionally be used to advantage in foamed acrylic compositions, are nucleating agents and surface active agents or surfactants. These additives provide sites for initiation of bubble formation and stabilize the bubbles as they grow and form cell walls and membranes. Effective use of such additives enhances cell formation and can improve the ultimate size, shape, and uniformity of the final cell structures.

The compositions of the present invention can be formulated for use in many existing applications of cellular or expanded plastics and elastomers. However, specific application, performance, physical aging, personal safety, environmental and economic benefits influence the applications for which they can provide the greatest practical or commercial advantage. In many cases, they will find utility in applications in which no currently acceptable product is totally acceptable. In general, the instant compositions provide the greatest advantage in applications that currently use semi-rigid or flexible, two-part polyurethane, epoxy, or polyester resins.

Polyurethane foams are very well established and economical materials for general-purpose structural applications, such as furniture padding, cushioning, and insulation. While there is no intention to exclude those applications, the benefits offered by foamed acrylic compositions, are of most immediate advantage:

1) In applications requiring durable adhesive bonds to such materials as metals, plastics and composites, painted surfaces, wood and other structural or decorative materials, alone or in combinations. Acrylic based compositions are well known for their outstanding bonding capabilities, and usually require very little or no cleaning or other surface treatments. Very clean and often primed surfaces are needed for durable, long-lasting bonds with polyurethanes;

2) In applications involving extended exposure to heat, ultraviolet rays, moisture, thermal cycling, and additional forms of outdoor or other in-service environments to which acrylic compositions are known to have superior resistance;

3) In applications incorporating both (1) and (2), such as lightweight structural adhesives and sealants; insulating tank coatings; void and seam fillers; gaskets; sound, vibration, and heat insulating coatings and the like. In many cases, polyurethane compositions require both a primer for adhesion and a protective coating after application. Such additional steps add cost, are time consuming, and provide opportunity for error;

4) In applications that require reduced emissions of toxic gases during overheating or combustion. Polyurethanes contain nitrogen which generates oxides and other toxic nitrogen compounds; preferred acrylic compositions for such applications can be formulated to contain, at most, traces of nitrogen or additional elements other than carbon, hydrogen, and oxygen;

5) In eliminating isocyanates in the work area;

6) In eliminating the release of chlorofluorocarbons to the atmosphere.

Epoxide resin and catalyzed polyester/styrene foams address some of these issues, but because of their relatively poor cell structures and physical properties, the foams have limited usage relative to polyurethanes. In fact, aside from the compositions of the present invention, no class of thermoplastic or thermoset resins has provided the range of hardness, elasticity, and overall excellent foam properties of the polyurethanes.

When combined with the advantages noted above, the uniqueness and usefulness of these compositions are even more apparent, particularly for foamed-in-place applications.

Another benefit of the acrylate and methacrylate resins, especially for foamed-in-place uses, is their ease of handling, mixing, and application. In this respect, the foamed compositions provide the same well-known advantages of non-foamed acrylic materials over other materials, especially polyurethanes.

The most convenient method of applying foamed-in-place urethane is by dispensing a moisture-curable polyurethane foam precursor from a pressurized container such as an aerosol can, which has been charged with a propellant gas mixture that usually includes a chlorofluorocarbon foaming (or blowing) agent. Reaction of atmospheric moisture with active isocyanate groups in the dispensed foamed resin promotes crosslinking and cure of the foam. However, this method is limited in its number of useful applications, releases environmentally undesirable gases to the atmosphere, and requires formulas that contain relatively large amounts of free isocyanate monomers.

Two-component mixing of polyurethane foam precursors, one of which contains water to produce "water blown" foam, often produces foams with reduced physical structure and properties. Most often three components, one of which is a physical foaming agent, such as a chlorofluorocarbons must be mixed simultaneously, in order to provide sufficient cell gas pressure for good foam formation as the polyurethane resin increases in viscosity through chemical reaction. The equipment for such three-component mixing is relatively complex and expensive.

Moreover, a high degree of component metering accuracy is necessary because polyurethane resins require precisely balanced mix ratios and thorough mixing for good results. In addition, the polyurethanes often require a long time to cure completely, or must be heated in ovens to complete or speed up their curing.

The ease of handling, mixing, and application of the acrylic compositions is due to their free-radical cure mechanism. By contrast with the requirements of the addition-polymerized polyurethanes, complete curing and full physical properties can be obtained with much less rigorous mixing accuracy and intensity. As a result, simple metering systems and simple static mixers can be used to mix and dispense the foamed acrylic compositions. The multi-component polyurethanes generally require complex dynamic or mechanical mixers that are costly and require frequent cleaning and maintenance.

The acrylic curing mechanism is also responsible for the ability of the compositions to polymerize or cure rapidly and completely at ambient or even cold temperatures.

With respect to the handling and foaming process itself, another unique feature of the preferred acrylic compositions is their ability to dissolve and be storage-compatible with small amounts of water. Water is especially useful in the generation of foam from inorganic gas precursors such as metallic carbonates, bicarbonates, and sodium borohydride. In the first case, water is believed to aid in the acid decomposition of the metallic carbonate or bicarbonate, to form carbon dioxide gas by aiding in the dissolution and/or disassociation of the gas generating components.

In the second case, the action of water on sodium borohydride causes it to decompose and form hydrogen gas as the generating species.

In addition to promoting the evolution of the foaming gas, the solution compatibility of water is believed to further contribute to the foaming process. It is well-known in the art that some degree of compatibility between the polymer and the foaming agents is advantageous in the development of cell and foam structures, and can reduce or eliminate the development of undesirably large bubbles and voids.

Moreover, the polymerization reaction in this invention occurs separately from the gas generation, that is, none of the polymer reactants are consumed by the foaming process itself. By contrast, water-blown polyurethane foams generate gas through reaction of isocyanate with water to form carbon dioxide. This consumes relatively expensive isocyanate monomer and can influence the properties of the urethane foam.

The complexity resulting from the simultaneously occurring processes of polymerization and foaming requires judicial and skillful manipulation of the compositional and process variables outlined above. As is well known in the vast art of polyurethane foam composition and processing, there is an extremely wide latitude in compositional and process variables available to those skilled in the art. The same holds true for the foamed compositions of this invention, and neither the preceding nor the following discussion is intended to be limiting in this respect, within the broad scope of the invention.

The effect of selected formulating variables on foamed polymer characteristics is illustrated by the discussion below and the examples that follow.

Foam Density

The density of the polymeric foams described in this invention, as well as those known in the prior art, is a direct function of the amount and type of foaming agents used, alone or in combination. A more specifically useful feature of this invention is that a relatively low level of gas generation can help overcome shrinkage, a characteristic that is common to most acrylate or methacrylate polymers, and many other vinyl compositions.

For example, methyl methacrylate, a preferred monomer of this invention, shrinks approximately 14 percent upon polymerization. This shrinkage can be partially offset by adding soluble polymers, fillers, etc, the reduction in shrinkage being roughly proportional to the amount of polymer or filler added. Even when so modified, these compositions undergo more shrinkage than typical epoxy or polyurethane formulations. This problem often results in such physical phenomena as: bondline "read through" when thin plastic panels are joined with acrylic adhesives; surface depressions when acrylic compositions are used in auto body repair or other filling applications; and surface depressions, imperfections and poor part size tolerances in casting applications.

By carefully adjusting the amount of gas generating components in the composition, it is possible to compensate for such shrinkage to eliminate the problems noted above. Minimizing the amount of gaseous expansion products will minimize their effect on the physical properties of the cured compositions.

Table I summarizes the range of expanded polymer or foam densities and lists some typical applications for each:

TABLE I

Densities of Expanded Acrylic Polymers

| Polymer Density* g/cc | Product Description | Typical Applications |
|---|---|---|
| 0.7–0.9 | shrinkage compensated polymer | structural adhesives casting void filling |
| 0.6–0.8 | high density foam | structural adhesives structural foam |
| 0.3–0.6 | medium density foam | semi-structural adhesives structural foam |
| <0.3 | low density foam | bonding, filling insulation, floatation, structural foam |

*Density without added fillers

Polymer Composition and Properties

A unique feature of the acrylic compositions of this invention is their wide range of formulating components and resulting range of physical properties. By varying the amount and type of elastomeric polymer or thermoplastic resin and core-shell graft polymers in the compositions, the properties of the cured polymer, and hence the resulting expanded or foamed polymer, can vary from a very low modulus rubber-like product to a rigid or semi-rigid product with high load bearing capability. Likewise, more subtle variation in the chemical make-up of the additive polymers can further influence properties such as resilience, or lack thereof, in the cured expanded polymer. The ability to adjust these physical properties is important in applications involving dynamic mechanical loads such as adhesive bonding, cushioning or shock absorption, mechanical and acoustic damping, and the like. Additional formulating additives such as fillers, plasticizers, crosslinking agents, and other materials well known to those skilled in the art, can be used to further influence these and other properties.

The addition of flame retarding fillers and additives can be used to advantage to produce expanded polymer products with varying degrees of resistance to ignition, combustion, flame spread, smoke evolution, and other important parameters relating to fire hazards. Specific polymer compositions can be selected so that toxic by-product emissions can be greatly reduced, especially compared with polyurethane foams which contain significant amounts of nitrogen and which are known to produce highly toxic combustion products.

Regrind Compatibility and Reprocessability

A very important environmental and economic benefit of the expanded acrylic polymer products is their compatibility with reprocessing or recycling operations. To illustrate by example, when two piece injection molded thermoplastic assemblies that have been adhesively bonded with an expanded methacrylate product are ground and added to virgin plastic pellets according to normal "regrind" processing procedures, the resulting parts and test specimens exhibit properties that are essentially identical to controls containing no methacrylate polymer.

Another form of recycling or reprocessing involves redissolving or redispensing cured methacrylate polymer in fresh monomer or fresh polymer-in-monomer solution. The resulting mixture can be catalyzed and polymerized to regenerate test specimens or articles that are very similar in appearance and performance to those made from fresh materials.

The reason for this ease of reprocessability is believe to derive at least in part from the fact that the cured compositions are largely thermoplastic in nature, especially in the absence of added crosslinking monomers.

By contrast, most expanded polyurethane compositions are thermosetting in nature, as are epoxy resin based materials. Often, recycling of such material, if feasible, involves grinding the products and using them as secondary fillers or extenders rather than regenerating like articles.

The compositions of this invention are usually prepared in two parts wherein one part contains the free radical catalyst and the other part contains the initiator or activator and the promoter if it is used. The foaming agent can be added to either or both parts. When a two part foaming agent is used, each component is added separately in the same manner as the free radical catalyst and activator are added. Just prior to use, the two parts are mixed together, and polymerization and foaming takes place.

The following examples describe the invention in more detail. Parts and percentages are by weight unless otherwise designated.

The components used in the examples are identified as follows:

MMA—Methyl methacrylate monomer containing 22–28 ppm of hydroquinone inhibitor.

MAA—Methacrylic acid containing 250 ppm of hydroquinone inhibitor

Kraton D116—Styrene-butadiene branched copolymer—Shell Oil Co.

Kraton D1117—Styrene-isoprene-styrene block copolymer—Shell Oil Co.

Paraloid KM753—Core-shell polymer of methyl methacrylate-butadiene styrene with high butadiene content—Rohm & Haas Paraloid KM330—All acrylic core-shell polymer—Rohm & Haas Hypalon 30—Chlorosulfonated polyethylene containing 43 percent chlorine and 1.1 percent sulfur—du Pont.

Geloy 1020—Core-shell polymer of acrylate rubber core and styrene acrylonitrile shell—General Electric.

Hydrin 10x1—Liquid epichlorohydrin homopolymer with Brookfield viscosity (27° C.) of $2.5\times10^5$ cps, a Tg of −25° C., and a number average molecular weight of 4,000—B. F. Goodrich.

Vanax 808—Butyraldehyde—aniline condensation product—R. Vanderbilt Co.
HET—N,N-bis(hydroxyethyl)-p-toluidine
NQ—1,4-napththoquinone
CHP—Cumene hydroperoxide, 80 weight percent in cumene
BHT—2,6-Di-tert-butyl p-cresol
BPO Paste Paste of 55 weight percent benzoyl peroxide in benzyl butyl phthalate plasticizer
Fumed silica—Cab-O-Sil M-5-Cabot Corp.
Xenoy 1102—Polycarbonate/polyester thermoplastic resin—General Electric Co.
DDA Diisodecyl adipate Examples 1–3 illustrate foamed methacrylate compositions that are useful for adhesive bonding.

EXAMPLE 1

A solution of polymer-in-monomer was prepared by rolling 1500 parts of Kraton D1117 and 1500 parts of methyl methacrylate in a glass jar for 2 days.

A second portion of methyl methacrylate was heated with paraffin wax on a steam bath until a clear liquid was obtained. This MMA—wax solution was added to a plastic container containing the polymer-in-monomer solution, HET, NQ, MAA and lactic acid. This mixture was mixed until uniform with a high speed disperser. The mixture was allowed to equilibrate overnight at 72° F. and was mixed again to obtain a smooth uniform paste. The amounts of each component used in the mixture are shown in Table 2 as Part A.

Part B was prepared by mixing the indicated amounts of DDA, fumed silica, and calcium carbonate with a high speed disperser. When a uniform mixture was obtained, the BPO paste was added followed by the water. Mixing was continued until a uniform paste was obtained.

Foamed polymers were prepared by adding Part A and Part B in a weight ratio of 7.4 parts of A to 1 part of B in an aluminum dish (6 cm diameter×14 mm high) and vigorously mixing in a circular motion by hand with a 1.5 mm×15 mm×14 cm wooden paddle. The resulting foamed polymer was allowed to cure at 72° F. for 2–3 hours before measuring the density. Foam densities were run according to the procedure described in ASTM D792.

The adhesive properties of the foamed plastic compositions were determined as follows:

On Xenoy 1102

As soon as thorough mixing was obtained, the foamable composition was applied to the 152 mm edge of a 152 mm×100 mm×3.2 mm piece of Xenoy with a 0.75 mm diameter wire shim at either end of the adhesive bead. A second piece of Xenoy with the same dimensions as the first, was placed over the adhesive to give a 12.7 mm×152 mm overlap and was clamped in place. The squeeze-out was removed with a spatula. After curing overnight at 72° F., the clamp was removed and the assembly was cut to give test specimens consisting of one piece of Xenoy 25.4 mm×100 mm bonded to another 25.4 mm×100 mm piece of Xenoy with a bond joint of 12.7 mm×25.4 mm×0.76 mm. The lap shear strength was determined per ASTM Test Method D1102 at a separation rate of 12.7 mm per minute.

On Polyvinyl Chloride (PVC)

Bond samples for compressive shear testing (per ASTM D 905) were prepared from 0.635 cm×2.54 cm×2.54 cm and 0.635 cm×2.54 cm×5.08 cm pieces of PVC bonded such that approximately 0.635 cm of overhang and 1.9 cm of overhang resulted at the top and bottom of the assembled test piece. The foamed adhesive composition was applied to the center of the bonded area of the 5.08 cm test piece and a 1.27 cm×0.051 cm wire ring spacer was placed in the center. The 2.54 cm test piece was aligned and pressed over the bonded area to squeeze the adhesive out of the perimeter on all sides to ensure complete coverage. The bonds were cured overnight at 72° F. The compressive shear bonds were tested at a cross-head speed of 0.127 cm per minute.

Foam densities and adhesive properties are shown in Table 2.

EXAMPLE 2

A solution of polymer-in-monomer was prepared from 750 parts of Kraton D1116 and 2250 parts of methyl methacrylate by rolling the components in a glass jar for 2 days.

A second portion of methyl methacrylate was heated with paraffin wax on a steam bath until a clear liquid was obtained. This MMA—wax solution was added to the Kraton solution, HET, NQ, MAA, lactic acid and diisodecyl adipate in a plastic container. Mixing with a high speed disperser was begun and Paraloid KM 753 was added while mixing continued. When a uniform mixture was obtained, the mixture was allowed to equilibrate overnight at 72° F. and was mixed again to give a smooth uniform paste. The amount of each component is shown in Example 2 Part A in Table 2.

Part B component was prepared using the same components, amounts and procedure as described in Example 1.

Foamed polymers were prepared by mixing 7.4 parts of Part A with 1 part of Part B using the procedure described in Example 1.

Foam densities and adhesive properties, determined as described in Example 1, are listed in Table 2.

EXAMPLE 3

Using the same procedure describe in Example 2, a foamed adhesive was prepared, the components and properties of which are listed in Table 2.

TABLE 2

| Example | 1 | 2 | 3 |
|---|---|---|---|
| | Part A | | |
| Composition parts | | | |
| Kraton D1116 | 0 | 15.33 | 14.97 |
| Kraton D1117 | 45.25 | 0 | 0 |
| DDA | 0 | 7.74 | 0 |
| MMA | 46.74 | 54.41 | 63.00 |
| Paraloid KM 753 | 0 | 14.70 | 14.36 |
| HET | 1.00 | 1.00 | 1.00 |
| NQ | 0.01 | 0.01 | 0.01 |
| MAA | 2.50 | 2.42 | 2.36 |
| Lactic Acid | 3.50 | 3.39 | 3.30 |
| Paraffin Wax | 1.00 | 1.00 | 1.00 |
| Brookfield Visc. cps TB Spindle | | | |
| 1 RPM | 656,000 | 816,000 | 1,120,000 |
| 10 RPM | 254,000 | 244,800 | 252,000 |
| | Part B | | |
| Composition Parts | | | |
| DDA | 49 | 49 | 49 |
| Fumed silica | 3.5 | 3.5 | 3.5 |
| Calcium Carbonate | 22.5 | 22.5 | 22.5 |
| BPO paste | 20 | 20 | 20 |
| $H_2O$ | 5 | 5 | 5 |

TABLE 2-continued

| Example | 1 | 2 | 3 |
|---|---|---|---|
| Mix ratio | | | |
| Part A: Part B: | 7.4:1 | 7.4:1 | 7.4:1 |
| Foam Density | 0.38 g/cc | 0.49 g/cc | 0.55 g/cc |
| Lap shear stg, psi on Xenoy 1102 | 580 CF | 917 CF | 1015 CF |
| Compressive shear | 693 CF | 1035 CF | 1435 CF |

CF - cohesive failure

Example 4 illustrates a foamable methacrylate composition that can be applied in a convenient one-to-one mixing ratio.

EXAMPLE 4

Part A

A polymer-in-monomer solution was prepared by rolling 40 parts of Hypalon 30 and 60 parts of methyl methacrylate in a glass jar for 2 days. To 58.4 parts of the polymer-in-monomer solution were added 19.1 parts of methyl methacrylate, 8.5 parts of methacrylic acid, 0.7 part of BHT, and 0.7 part of CHP. The components were mixed together until uniform with a high speed disperser. Five parts of Geloy 1020 and 8 parts of Paraloid KM 753 were added while mixing was continued. This mixture was allowed to equilibrate overnight at 72° F. and then mixed again to give a uniform paste.

Part B

Methyl methacrylate, 65.25 parts, 0.00014 part of copper acetylacetonate, and 6.74 parts of Vanax 808 were combined and mixed until uniform with a high speed disperser. Mixing was continued while 6.12 parts of Geloy 1020, 5.94 parts of Paraloid KM 753 and 5.94 parts of Paraloid KM 330 were added. Mixing was continued for 5 minutes. After equilibrating overnight at 72° F., the mixture was again mixed to give a uniform paste. Sodium bicarbonate, 10 parts, was then added and thoroughly dispersed.

A foamed polymer was prepared by mixing 1 part of Part A with 1 part of Part B using the procedure described in Example 1. The resulting semi-rigid foamed polymer had a density of 0.41 g/cc.

Example 5 illustrates the use of sodium borohydride as a foaming agent for expanded methacrylate compositions.

EXAMPLE 5

Part A

To a plastic container were added 96.99 parts of a 50.5 percent solution of Kraton D1117 in methyl methacrylate prepared as described in Example 1, 1 part of HET, 0.01 part of NQ, and 1 part of paraffin wax. The components were heated on a steam bath until the wax melted. The contents were then mixed until well dispersed. After cooling to 72° F., 1 part of sodium borohydride was added and mixed until uniform.

Part B

Hydrin 10×1, 30.2 parts, and 30.12 parts of diisodecyl adipate were mixed for 5 minutes, followed by the addition of 15.68 parts of Paraloid KM 753 with mixing on a high speed disperser. Mixing was continued until the mixture reached a temperature of 130° F. After equilibrating overnight at 72° F., 29 parts of BPO paste were added and mixed until uniform. Water, 5 parts, was added and mixed until uniform.

Part A, 8.5 parts, was mixed with 1 part of Part B using the procedure described in Example 1. The resulting soft, flexible foam had a density of 0.31 g/cc.

The following Example 6 illustrates convenient packaging and dispensing of the foamable methacrylate compositions using disposable plastic cartridges and static or motionless mixers, and the use of an inert gas as a physical blowing or foaming agent.

EXAMPLE 6

Part A

Using the same procedure described in Example 2, a smooth paste was prepared with the following composition:

| | |
|---|---|
| Kraton D1116 | 17.1 parts |
| MMA | 58.2 parts |
| HET | 1.0 part |
| NQ | 0.01 part |
| Paraloid KM 753 | 15.2 parts |
| DDA | 8.5 parts |

Part B

This part, prepared by the procedure described in Example 5, had the following composition:

| | |
|---|---|
| Paraloid KM 753 | 16.5 parts |
| Hydrin 10 x 1 | 31.8 parts |
| BPO Paste | 20.0 parts |
| DDA | 31.7 parts |

Foam Preparation

Part A and Part B were mixed in a weight ratio of 8.5:1 using the following procedure:

Part A and Part B were injected into the appropriate compartments of a “Supermix” 10:1 volume ratio coaxial cartridge made by Liquid Control Co. Attached to the cartridge was a 24 element ⅜" ID static mixer into which a 1 mm diameter hole was placed 4 cm from the end attached to the cartridge. As part A and part B were dispensed from the cartridge through the static mixer using a pressure of 90–95 psi, nitrogen was injected into the 1 mm hole at a pressure of 100 psi. The resulting dispensed foam was allowed to cure for 2–3 hours at 72° F. The density of the semi-rigid foamed plastic was determined to be 0.53 g/cc.

Example 7 and 8 illustrate the preparation of a foamable methacrylate composition from previously prepared and polymerized foamed plastics of the invention.

EXAMPLE 7

The Part A component was made using recycled foamed plastic. Foamed plastic prepared as described in Example 1 was cooled in liquid nitrogen and was impacted with a steel one pound hammer which had also been cooled in liquid nitrogen. The resulting coarse powder was then ground with a mortar and pestle which were cooled in liquid nitrogen. The powder was then sieved through a 16 mesh screen. The recovered fine powder was then used in the Part A formulation.

Using the procedure described in Example 1, Part A component and Part B component were prepared having the composition shown in Table 3. Foams were prepared by mixing Part A and Part B in a weight ratio of 7.4:1 using the procedure described in Example 1. The foam density and adhesive properties, determined as described in Example 1, are listed in Table 3.

EXAMPLE 8

Foamed plastic made as described in Example 2 was ground to a fine powder using the procedure described in Example 7. This powder was used as part of the composition for Part A which was prepared using the procedure described in Example 2. The Part A and Part B composition is shown in Table 3.

Foamed plastics were prepared using the procedure described in Example 1 and the foam density and adhesive properties were determined as described in Example 1. These properties are listed in Table 3.

TABLE 3

| Example | 7 | 8 |
|---|---|---|
| Composition Part A | | |
| Kraton D1117 | 19.51 | 0 |
| Kraton D1116 | 0 | 11.71 |
| MMA | 59.50 | 59.50 |
| Ground Foam - Ex 1 | 10.73 | 0 |
| Ground Foam - Ex 2 | 0 | 10.73 |
| HET | 0.98 | 0.98 |
| NQ | 0.01 | 0.01 |
| Lactic Acid | 3.41 | 3.41 |
| MAA | 4.88 | 4.88 |
| Paraffin Wax | 0.98 | 0.98 |
| DDA | 0 | 7.80 |
| Brookfield visc. cps TB Spindle | | |
| 1 RPM | 608,000 | 144,000 |
| 10 RPM | 227,200 | 76,800 |
| Composition, Part B | | |
| DDA | 49 | 49 |
| Fumed silica | 3.5 | 3.5 |
| Calcium Carbonate | 22.5 | 22.5 |
| BPO paste | 20 | 20 |
| $H_2O$ | 5 | 5 |
| Mix Ratio | | |
| Part A: Part B | 7.4:1 | 7.4:1 |
| Foam Density, g/cc | 0.36 | 0.36 |
| Lap Shear Stg, psi on Xenoy 1102 | 605 CF | 596 CF |
| Compressive Shear Stg, psi on PVC | 511 CF | 414 78% CF 22% AF |

CF = Cohesive Failure
AF = Adhesive failure

Example 9 illustrates the use of a foamed methacrylate adhesive composition to eliminate "read through" from a bonded automotive body panel.

EXAMPLE 9

The adhesive compositions in Table 3 were used to bond an injection molded thermoplastic reinforcing member to the upper, inside surface of the corresponding outer door panel. Both components were molded from Xenoy 1102 polycarbonate/polyester resin. The reinforcement and door panel had cross sectional thicknesses of 2.7 mm and 3.3 mm, respectively. The reinforcement was of such configuration that it was bonded along the upper curved portion of the door panel to support its entire length. The outer surface of the door panel constitutes what is known as a "Class A" surface in automotive terms, and must be free from even subtle or minor surface imperfections or irregularities, especially when painted and subjected to paint bake oven temperatures. Numerous phenomena, such as shrinkage of the adhesive or plastic panel, modulus mismatch between the two components, and thermal effects exaggerating these phenomena during various processing operations, can contribute to this complex and well-documented problem.

Separate pairs of identical door panels and reinforcements were bonded using Compositions 9a and 9b, respectively. The panels were bonded by extruding each adhesive from a "Liquid Control" cartridge similar to that described in Example 6, except that no nitrogen was injected, owing to the self-contained chemical foaming agent in Composition 9b. An adhesive bead approximately 6 mm in diameter, was applied along the entire length of the reinforcement. The reinforcement was pressed into its designated position inside the body panel. Bond thickness was controlled by several oval "stand offs" or spacers that had been molded into the reinforcement. Light pressure was applied to hold the parts in position while the adhesive cured.

The bonded panels were visually inspected for "read through" by holding them at a roughly perpendicular angle relative to a fluorescent light source, and sighting down the length of the body panel parallel to its surface. Several wavy depressions with approximate dimensions of 30 mm by 10 mm, running perpendicular to the direction of the bondline, were evident on the surface of the door bonded with Composition 9a. No such imperfections were apparent on the surface of the door bonded with foamed Composition 9b.

Composition 9a

Part A in Ex. 9a is identical to Part A in Ex. 6. Part B is identical to Part B in Ex. 6.

Composition 9b

Part A was made by dispensing 5 parts of sodium bicarbonate in 95 parts of Part A from Ex. 6, with a high speed disperser. Part B was made by mixing until uniform 20 parts of a 50 percent malonic acid n water solution with 80 parts of Part B from Ex. 6.

Example 10 illustrates a foamed composition formulated to have a cured polymer resin containing no more than trace amounts of elements other than carbon, hydrogen, and oxygen to minimize toxic combustion products, and containing flame retardant additives to resist the onset of combustion.

EXAMPLE 10

Part A was prepared by mixing 56.72 parts of a 50 percent Kraton D1117/MMA solution, 7.2 parts of a 10 percent paraffin wax/MMA solution, 0.72 parts of HET and 3.69 parts of MAA with a high speed disperser until uniform. Mixing was continued while 3.2 parts of a 45 percent sodium dodecyl benzene sulfonate/water solution, 13.82 parts of decabromodiphenyl oxide, and 14.75 parts of anitomony oxide were added. This paste was mixed until uniform.

Part B was prepared by mixing 49 parts of DDA, 5 parts of fumed silica, 5 parts of water, and 22.5 parts of sodium bicarbonate with a high speed disperser. Mixing was continued while 20 parts of BPO paste were added. This was mixed until uniform.

The foamed polymer was prepared by mixing 10.85 parts of Part A with 1 part of Part B, using the procedure in Ex. 1. The cured piece of foamed polymer was held over a 1" bunsen burner flame for 10 seconds. The flame was removed and the burning polymer self-extinguished in less than 2 seconds. The bunsen burner was placed under the foamed polymer for 30 seconds and then removed. The burning polymer self-extinguished again in less than 2 seconds.

EXAMPLE 11

Example 11 illustrates the technique of employing a relatively small amount of foaming agent to reduce the shrinkage of polymerizable methacrylate compositions in order to render them more effective as casting or liquid molding resins. Even though the composition illustrated contained approximately 50 percent by weight of polymer, it exhibited significant shrinkage upon curing.

EXAMPLE 11A

Part A was made by placing 99 parts of a 50 percent Kraton D1117/MMA solution in a jar along with 1 part of HET and rolling it until a uniform solution was obtained. Part A (8.5 parts) was placed in a polyethylene bag along with 0.2 part of BPO paste. This was kneaded until uniform to give a mixed composition with no entrapped air. The mixture had a density of 0.915 g/ml. This cured to give a non-foamed polymer with a density of 1.067 g/ml., corresponding to a shrinkage upon curing of 14.1 percent.

EXAMPLE 11B

The polymer was made by placing 8.5 parts of Part A from Example 11a, $1.8\times10^{-4}$ parts of sodium borohydride and 0.2 part of BPO paste into a plastic bag. This mixture was kneaded until uniform to give a mixed composition with no entrapped air. It cured to give a foamed polymer with a density of 0.84 g/ml, which, being substantially the same density as the unpolymerized mixture, i.e., 0.915 g/ml, indicated very little shrinkage.

The principles, preferred embodiments and modes of operation of the present invention have been described in the foregoing specification. The invention which is intended to protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A composition of matter for preparing a foamed polymer at ambient temperature, comprising:

A) a reactive mixture which undergoes a polymerization reaction at ambient temperature, including:
 about 40–90% by weight of a methacrylate ester monomer, including an ester group selected from the group consisting of allyl, cycloalkyl, and alkoxy groups, having 1 to about 12 carbon atoms; and
 about 10–60% by weight of a thermoplastic polymer soluble in the monomer;
 the polymerization reaction having a tendency to cause shrinkage of the reactive mixture;

B) a free radical-producing catalyst, in an amount sufficient to polymerize the reactive mixture; and C) a foaming agent which causes expansion of the composition of matter at ambient temperature, present in an amount sufficient that the expansion caused by the foaming agent at least offsets the shrinkage of the reactive mixture caused by the polymerization reaction, the foaming agent including a first part selected from metal carbonates, metal bicarbonates and combinations thereof, and a second part selected from acids.

2. The composition of claim 1, wherein the monomer comprises at least about 50% by weight methyl methacrylate.

3. The composition of claim 2, wherein the monomer further comprises an ethylenically unsaturated polymerizable acid, present at up to about 10% by weight by the monomer.

4. The composition of claim 3, wherein the polymerizable acid comprises methacrylic acid.

5. The composition of claim 2, wherein the monomer further comprises a polyfunctional monomer which includes at least two polymerizable ethylenically unsaturated groups per molecule, the polyfunctional monomer being present at up to about 10% by weight of the monomer.

6. The composition of claim 5, wherein the polyfunctional monomer comprises 2 to 6 ethylenically unsaturated groups per molecule.

7. The composition of claim 1, wherein the thermoplastic polymer comprises an elastomer.

8. The composition of claim 7, wherein the elastomer comprises a styrene-diene block copolymer.

9. The composition of claim 1, wherein the polymer is sufficiently soluble in the monomer to form a polymer-in-monomer solution including about 10–60% of the polymer based on the weight of the solution.

10. The composition of claim 1, wherein the thermoplastic polymer further comprises a core-shell graft copolymer which swells in the monomer but does not dissolve therein, in an amount up to about 25% by weight of the polymer.

11. The composition of claim 10, wherein the core-shell polymer is present at about 10–20% by weight of the thermoplastic polymer.

12. The composition of claim 1, comprising sufficient foaming agent to obtain a polymerized foamed composition having a density of about 0.25 g/cc to about the density of the composition prior to polymerization.

13. A process for preparing a foamed polymer at ambient temperature, comprising:

A) forming a reactive mixture which undergoes a polymerization reaction at ambient temperature, including:
 a methacrylate ester monomer, including an ester group selected from the group consisting of alkyl, cycloalkyl, and alkoxy groups, having 1 to about 12 carbon atoms; and
 a thermoplastic polymer soluble in the monomer;
 the polymerization reaction having a tendency to cause shrinkage of the reactive mixture;

B) adding a foaming agent which causes expansion of the reactive mixture at ambient temperature, in an amount sufficient that the expansion caused by the foaming agent at least offsets the shrinkage of the reactive mixture caused by the polymerization reaction, the foaming agent including a first part selected from metal carbonates, metal bicarbonates and combinations thereof, and a second part selected from acids;

C) adding a free radical-producing catalyst; and

D) activating the free radical-producing catalyst and foaming agent to produce the foamed polymer composition.

14. The process of claim 13, wherein the monomer comprises at least about 50% by weight methyl methacrylate.

15. The process of claim 14, wherein the monomer further comprises an ethylenically unsaturated polymerizable acid, in an amount up to about 10% by weight of the monomer.

16. The process of claim 15, wherein the polymerizable acid comprises methacrylic acid.

17. The process of claim 14, wherein the monomer further comprises a polyfunctional monomer which includes at least two polymerizable ethylenically unsaturated groups per molecule, the polyfunctional monomer being present at up to about 10% by weight of the monomer.

18. The process of claim 17, wherein the polyfunctional monomer comprises 2 to 6 ethylenically unsaturated groups per molecule.

19. The process of claim 14, wherein the polymer comprises an elastomer.

20. The process of claim 19, wherein the elastomer comprises a styrene-diene block copolymer.

21. The process of claim 13, wherein the polymer is sufficiently soluble in the monomer to form a polymer-in-monomer solution including about 10–60% of the polymer based on the weight of the solution.

22. The process of claim 13, wherein the thermoplastic polymer further comprises a core-shell graft copolymer which swells in the monomer but does not dissolve therein, in an amount up to about 25% by weight of the polymer.

23. The process of claim 22, wherein the core-shell polymer is present at about 10–20% by weight of the thermoplastic polymer.

24. The process of claim 13, wherein the foaming agent is activated by a reduction in pressure.

25. The process of claim 13, wherein the free radical-producing catalyst is activated by contacting it with an initiator.

26. The process of claim 13, wherein the free radical-producing catalyst is activated by contacting it with an initiator and a promoter.

27. A foamed polymer material having dimensions at least as large as a precursor reactive mixture, comprising the reaction product of the ambient temperature polymerization of the reactive mixture in the presence of a free radical-producing catalyst and a foaming agent;

the reactive mixture including about 40–90% by weight of a methacrylate ester monomer including an ester group selected from the group consisting of alkyl, cycloalkyl, and alkoxy groups, having 1 to about 12 carbon atoms;

the reactive mixture having a tendency to undergo shrinkage during polymerization at ambient temperature;

the foaming agent causing expansion of the reactive mixture and/or reaction product at ambient temperature in an amount sufficient to at least offset the shrinkage caused by the polymerization, the foaming agent including a first part selected from metal carbonates, metal bicarbonates and combinations thereof, and a second part selected from acids.

* * * * *